United States Patent [19]
Tajima et al.

[11] 3,753,685
[45] Aug. 21, 1973

[54] GAS BLOWING METHOD INTO FLUIDIZED BED

[75] Inventors: Osamu Tajima; Kouji Moriyama, both of Kawasaki; Daizo Kunii, Tokyo, all of Japan

[73] Assignee: Nippon Kokan Kabushiki Kaisha, Tokyo, Japan; by said Tajima and Moriyama

[22] Filed: Nov. 17, 1970

[21] Appl. No.: 90,413

[30] Foreign Application Priority Data
Nov. 28, 1969 Japan................. 44/95150

[52] U.S. Cl............................. 75/9, 75/26, 75/34
[51] Int. Cl............................................ C21b 1/02
[58] Field of Search .................. 75/9, 26, 34, 23; 23/1 F; 266/41

[56] References Cited
UNITED STATES PATENTS

| | | | |
|---|---|---|---|
| 3,404,078 | 10/1968 | Goldberger | 23/1 F |
| 3,251,677 | 5/1966 | Jolley | 75/26 |
| 2,925,330 | 2/1960 | Knops | 75/26 |
| 3,212,878 | 10/1965 | Bouteille | 75/34 |
| 3,097,923 | 7/1963 | Arkless | 23/1 F |
| 3,190,470 | 6/1965 | Ritter | 75/23 |

*Primary Examiner*—L. Dewayne Rutledge
*Assistant Examiner*—Peter D. Rosenberg
*Attorney*—Flynn & Frishauf

[57] ABSTRACT

A method of blowing reactant gas into a fluidized bed wherein a feeding pipe is inserted from the upper part of the fluidized bed so as to blow the reactant gas in position most effective for reaction.

1 Claim, 2 Drawing Figures

3,753,685

INVENTOR.

BY

GAS BLOWING METHOD INTO FLUIDIZED BED

The present invention is related to a method of blowing reactant gas into a fluidized bed wherein a feeding pipe is inserted from the upper part of the fluidized bed so as to blow the reactant gas in position most effective for reaction.

In the known fluidized beds of the prior methods, the reactant gas is blown through the wall of the fluidized bed. In such a method the reaction accompanied by voilent heat generation often melts and damages the parts near the blow hole, or the fused particles in the fluidized bed often fill and stop the blow holes or even the whole body of the bed.

Figure 1:
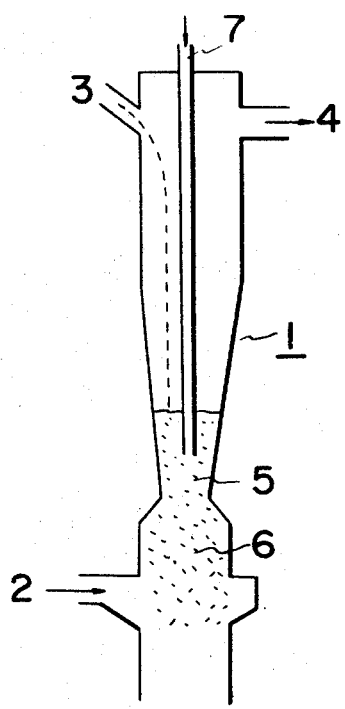
Figure 2:
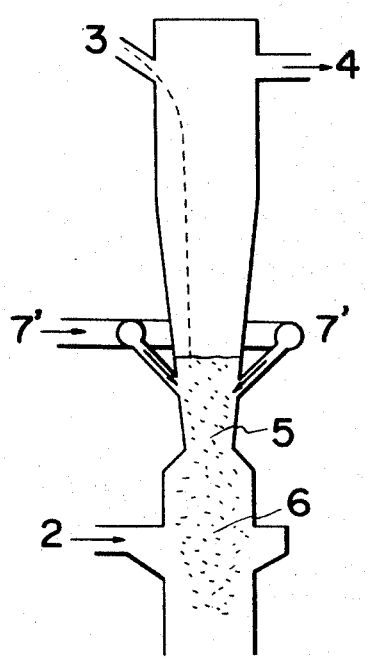

The present invention has been contrived in order to obviate the aforementioned defects of the prior methods and will now be described more in detail the references being made to accompanying drawings in which:

FIG. 1 shows a fluidized bed utilizing the present invention method of gas blowing; and FIG. 2 shows a diagrammatically apparatus for a fluidized bed utilizing the conventional method.

In FIG. 1, the fluidized bed 1 is provided with a gas blow pipe 2 in the lower part thereof, a raw material feeding hole 3 and exhaust gas hole 4 in the upper part thereof and comprises fluidized bed 5 and moving bed 6.

In FIG. 2, a fluidized bed constructed by the conventional method is shown wherein the blowing of reactant gas is made through reactant gas blow holes 7' provided in the side wall of the fluidized bed 1. The other figures correspond to those of FIG. 1.

The reference is now made to the reducing reaction of composite pellets comprising iron ores and coal in fine powder form. Said pellets are fed from raw material feeding hole 3 and cracked gas which is derived by partial oxidation of hydrocarbon is fed through the gas blow hole 2. The pellets fluidized in the fluidized bed 5 travel down to the moving bed 6 of pellets located directly therebeneath. Pellets are then brought out from a suitable outlet (not shown) located in the lower part thereof. From the reactant gas feeding pipe 7 the lower end of which is submerged in the bed or holes 7' is fed, directly into the body of the bed oxygen containing gas to burn cracked gas and the combustible gas generated from composite pellets in order to heat and reduce the pellets. The exhaust gas after combustion is let out through the exhaust hole 4.

The following is one example of operating conditions:

1. Pellets used: diameter 4 – 6 mm
   (% by weight: Pyrite cinder 75 %, coal 23 %, others 2 %)
2. Average residence time in the fluidized bed: 10 minutes
3. Gas blown through gas blowing holes 2:
   1.3 times the minimum amount required for fluidizing pellets
   Composition: $N_2$ 66.6 %, $CO_1$ 13.0 %, $CO_2$ 5.2 % $H_2$ 9.1 %, $H_2O$ 6.1 %
   Gas temperature: 1,000°C
4. Temperature in the fluidized bed: 1,100°C
5. Gas blown through feed pipe 7 or 7'
   0.5 times the minimum amount reguired for fluidizing pellets
   Composition: $O_2$ 15 %, $N_2$ 85 %
   Temperature: 550°C

| Feed Pipes | Present invention (FIG. 1) | Conventional type (FIG. 2) |
|---|---|---|
| Inner diameter | 20 mm | 8 mm |
| Number of pipes | 1 | 6 |

The work was carried out under the afore-mentioned conditions and the inventors found that the conventional type apparatus showed pellets being sintered at the upper part of the blow holes in the wall about 5 minutes after the start of the operation and in the end the fluidized bed was filled and stopped. Whereas in the present invention apparatus, the pellets were not sintered and smooth operation was obtained. The degree of pellets metallized at the time of removing pellets from the fluidized bed was 80 percent.

The present invention is now summarized in the following manner in which the characteristics of the present invention are now listed.

1. When gas is blown through the side wall of the fluidized bed, pellets are likely to be sintered and fill and stop the blow hole or even of the fluidized bed as a whole. The present invention obviates all these troublesome defects of the prior art.
2. When gas is blown through the side wall of the fluidized bed, defects are seen in the vicinity of the blow holes and the amount of gas to be blown is limited. The present invention facilitates blowing of gas in unlimited amount.
3. According to the present invention method, the repairing and exchange of a gas feeding pipe is quite easy.
4. In the present invention, the feeding pipe can be moved vertically and horizontally to blow the gas into the best possible position and in accordance with the reaction conditions in the fluidized bed.
5. In the present invention, the number of the feeding pipes may be increased in accordance with the reaction conditons in the fluidized bed.

What is claimed is:

1. In the process of reducing pelletized iron oxide ore in a fluidized bed reactor having a fluidized bed of said ore and a cracked hydrocarbon fluidizing gas therein, the improvement in combination therewith, comprising;

introducing an oxygen-containing gas through a feed pipe disposed from an upper part of said reactor such that the lower end thereof is submerged in said fluidized bed, directly into the body of said fluidized bed and below the surface of said fluidized bed, while adjusting the vertical and horizontal position of said feed pipe within said fluidized bed so as to avoid the sintering of bed particles, said fluidizing cracked hydrocarbon gas being introduced into said fluidized bed below the point at which said oxygen-containing gas is introduced into said fluidized bed, and said oxygen-containing gas reacting with said cracked hydrocarbon fluidizing gas and with said ore.

* * * * *